United States Patent [19]

Johnson, Jr. et al.

[11] Patent Number: 5,115,427
[45] Date of Patent: May 19, 1992

[54] ARRANGEMENTS FOR SWITCHING MULTIPLE PACKET TYPES COMBINED IN A SINGLE PACKET STREAM

[75] Inventors: James M. Johnson, Jr., Marietta, Ga.; Ronald A. Spanke, Wheaton, Ill.

[73] Assignee: AT&T Bell Laboratories, Murray Hill, N.J.

[21] Appl. No.: 502,352

[22] Filed: Mar. 30, 1990

[51] Int. Cl.⁵ .......................................... H04Q 11/04
[52] U.S. Cl. ...................................... 370/60; 370/94.1
[58] Field of Search ....................... 370/60, 94.1, 58.1, 370/112

[56] References Cited

U.S. PATENT DOCUMENTS

| | | | |
|---|---|---|---|
| 4,592,048 | 5/1986 | Beckner et al. | 370/60 |
| 4,713,806 | 12/1987 | Oberlander et al. | 370/60 |
| 4,720,854 | 1/1988 | Sand | 370/58.1 |
| 4,731,785 | 3/1988 | Ferenc et al. | 370/60 |
| 4,763,317 | 8/1988 | Lehman et al. | 370/58 |
| 4,821,259 | 4/1989 | DeBruler et al. | 370/60 |
| 4,912,701 | 3/1990 | Nicholas | 370/60 |
| 4,964,119 | 10/1990 | Endo et al. | 370/60 |

*Primary Examiner*—Douglas W. Olms
*Assistant Examiner*—Dang T. Ton
*Attorney, Agent, or Firm*—R. T. Watland; K. H. Samples; M. B. Johannesen

[57] ABSTRACT

An arrangement for switching broadband ISDN (B-ISDN) packets is disclosed. The arrangement comprises a broadband packet switch connected to B-ISDN customers and to a narrowband switch via an interface unit. B-ISDN control packets are connected by the broadband packet switch to the narrowband switch which transmits them to a control unit. The control unit responds to control messages by controlling the broadband packet switch to selectively interconnect B-ISDN customers and by controlling the broadband packet switch, the interface means and the narrowband switch to selectively interconnect B-ISDN and narrowband customers.

23 Claims, 5 Drawing Sheets

*FIG. 1*

BROADBAND SWITCHING MODULE 6000

TRANSLATION
TABLE
63
(FOR 6003)

| VCI IN | PRH | VCI OUT |
|---|---|---|
| 1 | 6005 | 16 |
| 18 | 6004 | 64 |
| 200 | 6007 | 203 |
| . | . | . |
| . | . | . |
| . | . | . |

*FIG. 6*

TRANSLATION
TABLE
63
(FOR 6004)

| VCI IN | PRH | VCI OUT |
|---|---|---|
| 1 | 6005 | 17 |
| 64 | 6003 | 18 |
| 80 | 6005 | 65 |
| 200 | 6007 | 204 |
| . | . | . |
| . | . | . |

*FIG. 7*

TRANSLATION
TABLE
63
(FOR 6005)

| VCI IN | PRH | VCI OUT |
|---|---|---|
| 16 | 6003 | 1 |
| 17 | 6004 | 1 |
| 65 | 6004 | 80 |
| . | . | . |
| . | . | . |
| . | . | . |

*FIG. 8*

INTERFACE 6100

FIG. 9

ARRANGEMENTS FOR SWITCHING MULTIPLE PACKET TYPES COMBINED IN A SINGLE PACKET STREAM

CROSS-REFERENCE TO RELATED APPLICATION

This application is related to the following application: R. A. Spanke, Ser. No. 07/502,592, "Broadband ISDN Packet Switching Arrangements".

The related application is filed concurrently herewith and is assigned to the assignee of the present invention.

TECHNICAL FIELD

This invention relates to packet switching systems for switching packets among broadband and narrowband packet users.

BACKGROUND OF THE INVENTION

The extensive use of personal computers and other data processing facilities at home and in the office gave rise to a need for providing voice and data transmission and switching capabilities on a wide spread basis. To satisfy this need, the integrated services digital network (ISDN) was developed for use by telecommunications subscribers. With ISDN service, telecommunication customers have access to two-64 kilobit per second circuit switched B channels and one-16 kilobit per second D channel which is used for packet switching and for the exchange of control information. The B and D channels are multiplexed at customer equipment onto a communication path and are separated at the switching office by a relatively simple demultiplexing stage which applies the B-channels to a circuit switch and the D-channels to a packet switch.

The continuing growth of digital services and capabilities has now created a need for transmission and switching arrangements which have the capacity for larger bandwidths on the order of 150 megabits per second. The high bandwidth can be used for rapidly transmitting large amounts of computer data and for distributing more continuous high bandwidth information such as television signals. In response to the need for higher information bandwidths, a new capability known as broadband ISDN (B-ISDN) is being developed.

B-ISDN standards envision fiber optic connections to both residential and business subscribers which convey packetized information at approximately 150 megabits per second. The high bit rate provides an efficient medium for high bandwidth information while a relatively small packet size, i.e., 53 bytes, provides efficiencies for low bandwidth users such as narrowband voice and ISDN users.

With B-ISDN the header of each packet includes a virtual channel identifier which identifies the communication of which the packet is a part. No separate multiplexed channels of the type used to convey B and D channels in narrowband ISDN (N-ISDN) are used. The mix of packet types on a B-ISDN fiber is not defined and may consist of many nonrelated packets, each conveying narrowband information such as voice or may consist of many related packets all conveying parts of a single high bandwidth information exchange. The design of switching equipment which is capable of switching the diverse traffic mix of B-ISDN is a difficult task.

One possible design for a B-ISDN network would include broadband and narrowband networks and an input stage to separate the different types of traffic onto the different networks. Such a design would be similar to a N-ISDN switching network of the type disclosed in Beckner et al., U.S. Pat. No. 4,592,048. The use of such an input stage to separate traffic is not an efficient design for B-ISDN networks. Traffic separation at the network input requires an additional input switching stage which increases the transfer time of information through the network and adds to the expense of the overall network. The added expense is large in the case of B-ISDN since the input separator stage would not just demultiplex the incoming information stream but would analyze the header of each incoming packet to make separation decisions. Also the separation of information types onto multiple networks, e.g., broadband and narrowband complicates substantially the connection of the information between users of different types.

A need exists in the art for a switching arrangement which can receive a B-ISDN information stream and selectively connect the incoming packetized information to the appropriate broadband and narrowband customers in an efficient and cost effective manner.

SUMMARY OF THE INVENTION

This need is met and a technical advance is achieved in accordance with the invention in a which a broadband packet switch is connected to a plurality of broadband customers and to a narrowband switch for selectively connecting broadband packets among the broadband customers and the narrowband switch. The broadband packet switch responds to a broadband service request packet identifying first and second broadband customer lines by connecting the service request packet to a control unit via the narrowband switch and the control unit responds to the service request packet by controlling the connection of packets between the first and second customer lines. The use of a broadband switch to complete broadband connections and to distribute call setup packets to the control unit via the narrowband switch avoids the use of an input traffic distribution network and the inefficiencies of separating broadband and narrowband traffic.

In an embodiment of the invention, the broadband service request is a call set up packet which includes a first predetermined signaling virtual channel identity to which the broadband packet switch responds by completing the connection of the call set up packet to the narrowband switch. The broadband packet switch also changes the first predetermined virtual channel identifier to a second predetermined virtual channel identifier to which the narrowband switch responds by connecting the call set up packet to the control unit.

The control unit is connected to and exercises control over both the broadband switch unit and the narrowband switch unit. In an embodiment of the invention, the control unit selects virtual channel identifiers for communication and notifies the broadband and narrowband switch units of the connections to be performed for each selected virtual channel identity. The control unit also formulates outgoing control messages which are transmitted through the narrowband switch unit and the broadband packet switch to notify broadband customers of the virtual channel identifiers to use for a particular connection.

A connection between first and second broadband ISDN customers is established when the first customer sends to the broadband packet switch a call set up packet requesting a communication between the first and second customers and including a predetermined signaling virtual channel identifier. The broadband packet switch which responds to the predetermined virtual channel identifier by connecting the call set up packet to the narrowband switch unit which in response to the virtual channel identifier of the call set up packet transmits the call set up packet to the control unit. The control unit, in response to the identity of the first and second customers, selects a virtual channel identifier for the requested communication and computes a physical address between the first and second customers through broadband packet switch. The control unit then notifies the broadband packet switch of the computed physical address so that packets arriving from the first customer with the selected virtual channel identifier are connected by the broadband packet switch to the second customer.

A call between a broadband customer and a narrowband customer is also started with a call set up packet which is connected through the broadband packet switch and the narrowband switch to the control unit. The control unit selects a broadband virtual channel identifier which is used to connect broadband packets to the narrowband switch unit which distributes the information conveyed by the packet to the narrowband customer.

In an embodiment, the narrowband switch comprises an interface unit which exchanges packets with the broadband switch unit and transmits information from received broadband packets to a circuit switch for selective connection to narrowband customers. The circuit switch also selectively connects information received from the narrowband customers to the interface unit which converts the information into broadband packets for transmission to an input of the broadband switch means.

DETAILED DESCRIPTION

Figure 1:
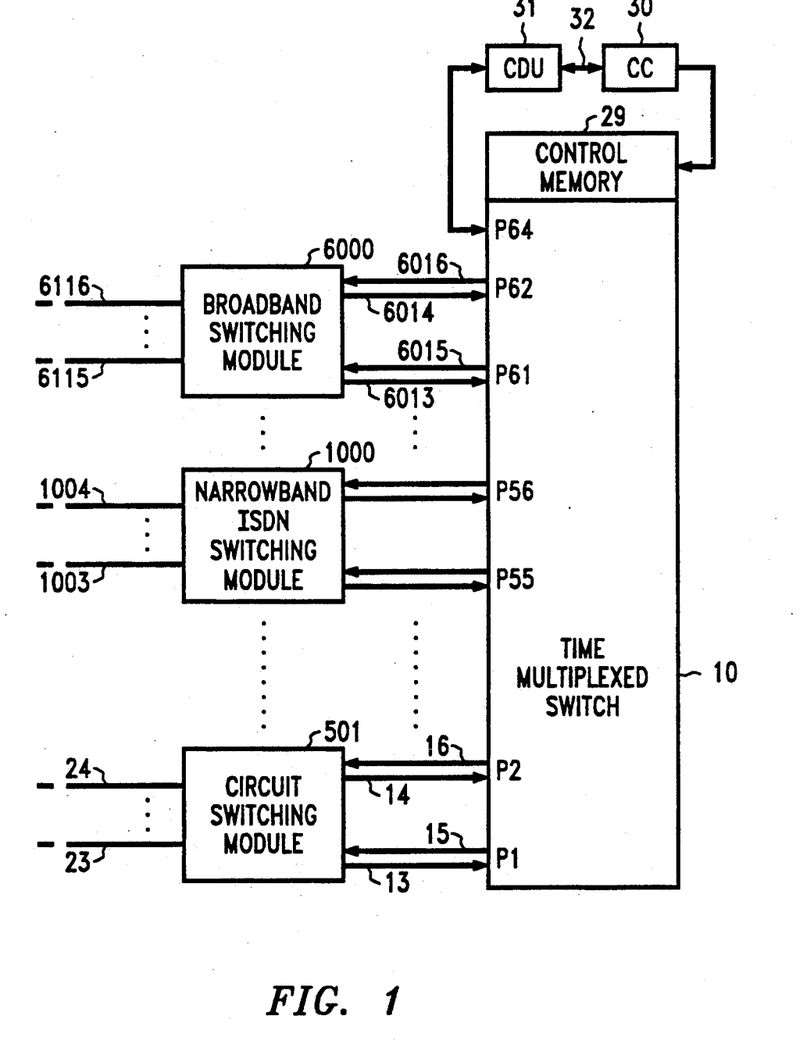
FIG. 1 is a block diagram of a switching system incorporating the present invention.

FIG. 1 is a block diagram of a telecommunication system illustrating the principles of the present invention. The illustrated system includes a plurality of switching modules 501, 1000 and 6000 which are each connected to two input/output ports P1 through P62 of a time-multiplex switch 10 via a pair of bi-directional time-multiplex lines comprising, for example, time-multiplex lines 13 through 16. Time-multiplex switch 10 completes time-shared space division paths among the switching modules 501, 1000 and 6000 under control of information stored in a control memory 29 to enable communication among the switching modules. Control information necessary to coordinate the operation of the switching modules and the time-multiplex switch 10 is exchanged between the switching modules and between the switching modules and a central control 30 via time-multiplex switch 10 and a control distribution unit 31.

Each of the switching modules is connected to a plurality of customer lines and trunks, e.g., 23 and 24 and either interconnects the lines and trunks connected thereto or cooperates with the central control 30 and other switching modules to complete connections between customers of different switching modules via the time-multiplex switch 10. Switching module 501 is a circuit switching module and is connected to, for example, analog telephone customers via lines 23 and 24. Circuit switch module 501 performs analog to digital and digital to analog conversion, time slot interchange for digitized customer signals and cooperates with central control 30 and the other switching modules for the connection of its customers.

Narrowband ISDN switching module 1000 is connected to a plurality of ISDN customers via narrowband ISDN lines 1003 and 1004 and provides connections between the ISDN customers and other customers of the system of FIG. 1. Narrowband switching module 1000 separates the B- and D-ISDN channels, provides packet switching connections for the D channels and circuit switch connections for the B channels using a time slot interchanger (not shown). A system of the type shown in FIG. 1 comprising narrowband ISDN switching modules and circuit switching modules is shown and described in detail in Beckner et al., U.S. Pat. No. 4,592,048 and is described herein only in so far as necessary to describe the operation of broadband switching module 6000 and its cooperation with the other units of FIG. 1.

Figure 2:
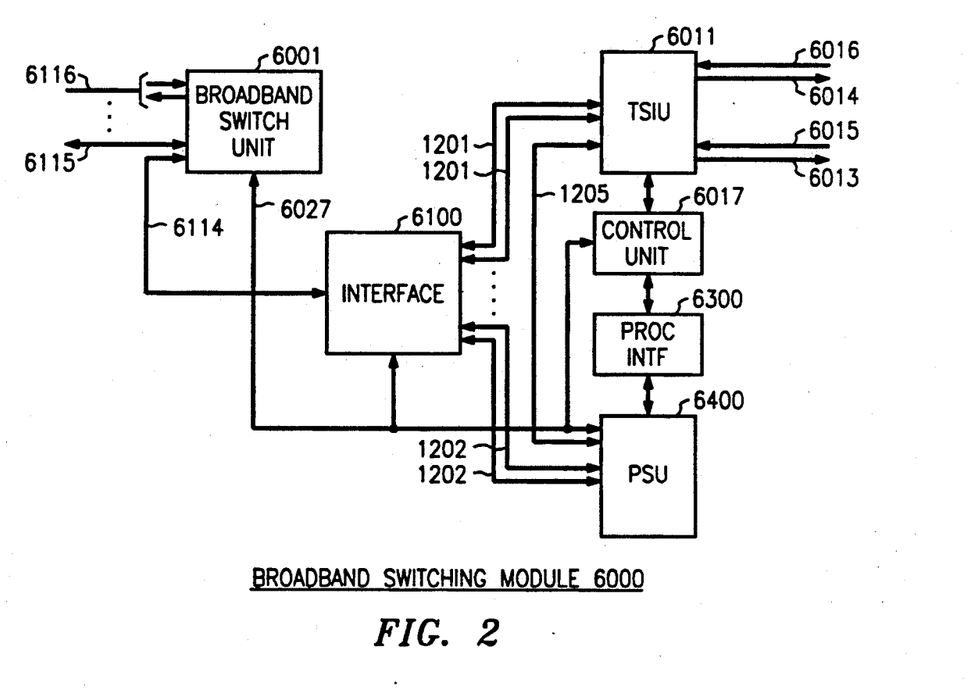
FIG. 2 is a block diagram of broadband switching module shown in FIG. 1.
Figure 3:
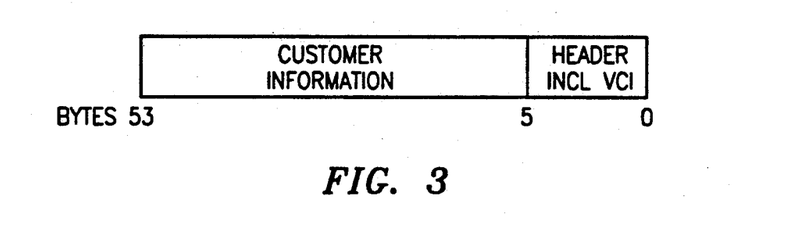
FIG. 3 is a representation of broadband ISDN packet.

Broadband switching module 6000 shown in greater detail in FIG. 2, comprises a broadband switch unit 6001 which is connected to a plurality of B-ISDN customers over a plurality of bi-directional B-ISDN optical fibers 6115 and 6116. Optical fibers 6115 and 6116 convey packets of digital information at the rate of 150 megabits per second where each packet (FIG. 3) comprises 48 bytes of customer information and 5 bytes of header information. The header information includes certain packet overhead information such as error checks and the virtual channel identifier (VCI) of the packet. The VCI of a packet uniquely identifies, on a given communication path, the communication of which the packet is a part.

Although all packets on communication paths 6115 and 6116 are in the B-ISDN format they may be parts of different communications and may be to or from non-B-ISDN customers. For example, a B-ISDN packet virtual channel may be a high bandwidth, e.g., 20 megabits per second channel between two B-ISDN users, it may be a low bandwidth, e.g., 64 kilobits per second channel between B-ISDN users or it may be a 64 kilobits per second channel between a B-ISDN user and a narrowband ISDN telephone set on narrowband switch module 1000. Broadband switch module 6000 responds to the VCIs of the packets it receives to interconnect the users of the identified virtual channel.

Broadband switch unit 6001 of broadband switch module 6000 is connected to customer communication paths 6115 and 6116, as well as to a bi-directional communication path 6114 connected to an interface 6100. Broadband switch unit 6001 responds to the VCI of each packet received on a communication path by connecting the received packet to a predetermined one or more of the outgoing optical fiber communication paths 6114 through 6116. The predetermined output for most VCIs is selectively changed from time-to-time by a control arrangement which is discussed in more detail later herein. When the outgoing communication path is connected to a customer fiber, e.g., 6115 the packet is sent to the customer connected to that fiber in the same form that it was received, i.e., FIG. 3. The predetermined output for packets having certain VCIs is communication path 6114 which is connected to the interface unit 6100. Fiber 6114 and the interface unit 6100 receive all B-ISDN packets containing system control information and all B-ISDN packets which are to be connected to non-B-ISDN customers such as customers connected to narrowband switching module 1000 or circuit switch module 501.

Interface unit 6100, which is described later herein, receives packets on communication line 6114 and places them in buffer storage for transmission in selected time slots on selected ones of a plurality of bi-directional time-multiplex lines 1201 and 1202. Transmission on time-multiplex lines 1201 and 1202 takes place at the rate of 64 kilobits per second. The particular time slot and time-multiplex line for a packet received from communication path 6114 is selected by interface unit 6100 in response to the VCI of the received packet. Lines 1201 are connected to a time slot interchange unit 6011 and lines 1202 are connected to a packet switch unit 6400. Interface unit 6100 also receives information from the time slots on time-multiplex lines 1201 and 1202, and buffers the information until an entire B-ISDN packet is received. Upon receipt of an entire packet from a given time-multiplex line time slot interface unit 6100 affixes a preselected VCI to the packet and transmits the packet to broadband switch unit 6001 via communication path 6114.

Time slot interchange unit 6011 receives time slots of information on time-multiplex lines 1201 and selectively connects those time slots to the time slots of time-multiplex lines 6013 and 6014 for connection to the time-multiplex switch 10. Time-multiplex switch 10 connects the time slots to other switching modules, e.g., 1000 and 501. Similarly, information from other switching modules is selectively connected from time-multiplex switch 10 to time slot interchange unit 6011 in the time slots of time-multiplex lines 6015 and 6016.

Packet switch unit 6400 accumulates the packets from interface unit 6100 and provides narrowband packet switching among the time-multiplex lines 1202. Information returning to the interface unit 6100 from packet switch unit 6400 is accumulated into B-ISDN packets, provided with a preselected VCI and transmitted to broadband packet switch unit 6001 via communication path 6114.

Broadband switching module 6000 includes a control unit 6017 which operates in conjunction with central control 30 and the control units (not shown) of other switching modules, e.g., 501 and 1000 to control the broadband switch unit 6001, the interface unit 6100, the time slot interchange unit 6011 and the packet switch unit 6400. In addition to control information received from central control 30 and the other switching modules, control information is received and transmitted by control unit 6017 from and to the customer communication paths, e.g., 6115 via the packet switch unit 6400, the interface unit 6100 and the broadband switch unit 6001. Control unit 6017 exercises control of the units within switching module 6000 over conductor 6027.

Certain of the available VCIs on the B-ISDN communication paths, e.g. 6115, are preassigned for specific purposes. For example VCI 1, which is referred to as a layer management channel, is used by B-ISDN customers to send and receive control information such as call set-up information to and from broadband switch module 6000. Broadband switch unit 6001 recognizes each packet with VCI 1 and connects that packet to interface unit 6100 via communication path 6114 using a virtual channel identity which is preassigned for the exchange of control information between the particular incoming communication path, e.g., 6115 and interface unit 6100.

Figure 4:
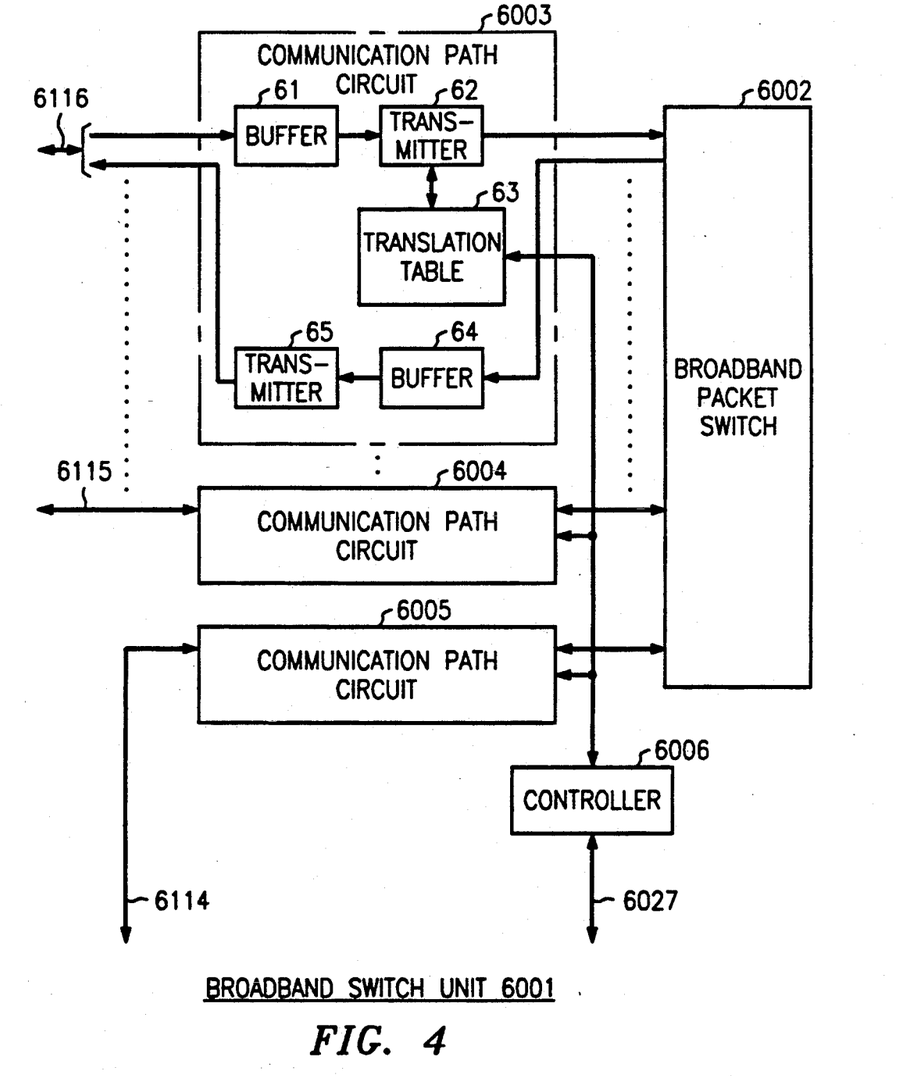
FIG. 4 is a block diagram of a broadband switch unit of FIG. 2.
Figure 5:
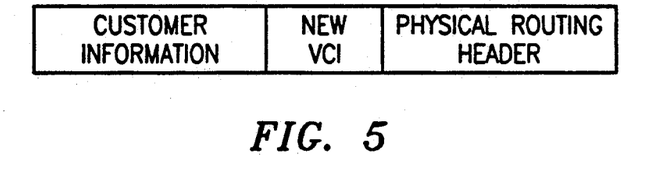
FIG. 5 is a representation of a broadband packet sent to the inputs of the broadband packet swtich of FIG. 4.

FIG. 4 is a more detailed representation of broadband switch unit 6001 which comprises a broadband packet switch 6002, a controller 6006, a communication path circuit, 6003 and 6004 for each communication path 6115 and 6116, respectively, and a communication path circuit 6005 for communication path 6114. Communication path circuits 6004 and 6005 are substantially identical to communication path circuit 6003, which is shown in detail in FIG. 4. Each communication path circuit receives packets from a B-ISDN line, e.g., 6116 and buffers them in a buffer 61. A transmitter 62 reads a packet from buffer 61 and, responsive to the received VCI, reads a new VCI and physical routing header from translation table 63 in preparation for sending the packet to broadband packet switch 6002. The transmitter 62 replaces the incoming packet VCI with the new VCI, appends the physical routing header to the packet and transmits the packet and physical routing header to the broadband switch network 6002. A packet, as transmitted to broadband packet switch 6002, is shown in FIG. 5.

Broadband packet switch 6002 responds to the physical routing header of each packet it receives by transmitting that packet to a communication path circuit, e.g., 6004 identified by the physical routing header. The identified communication path circuit 6004 receives the packet and stores it in a buffer 64. A transmitter 65 reads packets from the buffer 64, removes the physical routing header and transmits the packet in B-ISDN format (FIG. 3) to the destination customer on communication path 6115. Communication path circuit 6005 responds similarly to transmit packets from broadband packet switch 6002 to the interface unit 6100 over the communication path 6114.

Translation table 63 of a communication path circuit, e.g., 6003 stores the physical routing header and the new VCI for each packet received on its connected communication path, e.g., 6116. For VCIs which identify communication among customers, the new VCI and physical routing header stored in translation table 63 are computed by control unit 6017 and transmitted to table 63 when a connection is set up. Other VCIs on the communication paths, e.g. 6115, are permanently assigned to a switching function and the new VCI and physical routing headers associated therewith are stored in the translation table 63 when the system is initialized. For example VCI 1 is assigned to be a control information channel on both communication paths 6115 and 6116. The physical routing header stored with regard to VCI 1 in translation tables 63 of communication path circuits 6003 and 6004 identifies the communication path circuit 6005 which is connected to the interface unit 6100 via communication path 6114. The new VCI stored in each translation table 63, is unique for each communication path 6115 and 6116 so that the interface unit 6100 can distinguish the source of the control information.

Figure 6:
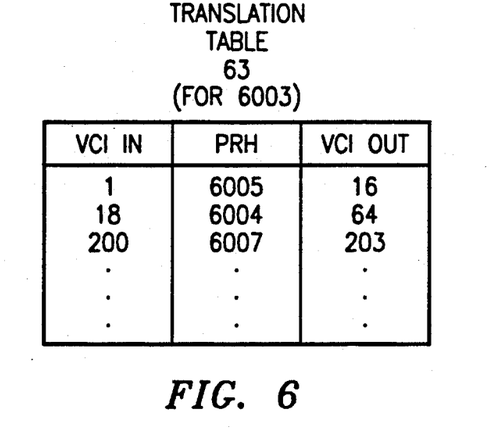
FIGS. 6 through 8 represent translation tables of information stored in the communication path circuits of FIG. 4.
Figure 7:
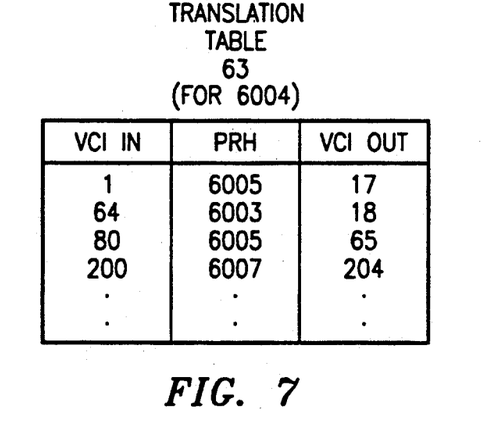
Figure 8:
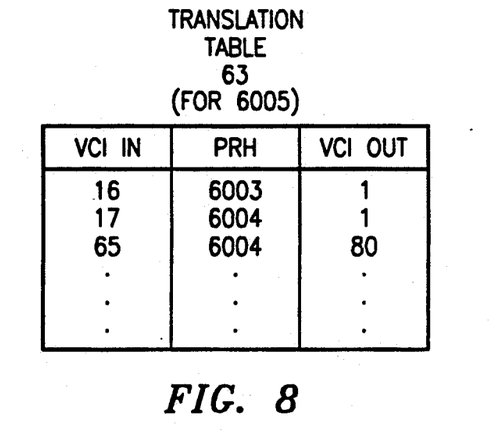

FIGS. 6, 7 and 8 are representations of translation table 63 of communication path circuits 6003, 6004 and 6005, respectively. Each line of the represented translation tables corresponds to a received VCI (VCI IN) from one of communication paths 6114, 6115 or 6116 and identifies the physical routing header (PRH) to be appended to the packet and the new VCI (VCI OUT) to be used to replace the received VCI. The first line of FIG. 7 shows that when a B-ISDN packet is received in VCI 1 (the preassigned control channel) a physical routing header (PRH) defining communication path circuit 6005 is to be appended to the packet and the new VCI of 17 is to be used to replace the received VCI of 1 before the packet is transmitted to the broadband packet switch 6002. Similarly, as shown in FIG. 6, when a packet having VCI 1 is received from communication path 6116 by communication path circuit 6003, a physical routing header defining communication path circuit 6005 and a new VCI of 16 are appended to the packet before it is transmitted to broadband packet switch 6002. It can be seen from these two examples that although each of the represented packets is received in the control channel VCI 1 and sent to the same communication path circuit 6005 they are each given different VCIs (16 and 17) which are transmitted through communication path circuit 6005 to interface 6100. The distinctive VCIs of 16 and 17 are used to distinguish between information from communication path circuit 6003 and communication path 6004. The second lines of FIGS. 6 and 7 represent an ongoing communication between customers attached to communication paths 6115 and 6116. As shown in FIG. 6, packets received in VCI 18 at communication path circuit 6003 are sent to communication path circuit 6004 of communication path 6115 in VCI 64. The other direction of the communication is represented in FIG. 7, which shows that packets received from communication path 6115 in VCI 64 are sent to communication path circuit 6003 of communication path 6116 in VCI 18. The translation table represented in FIG. 8 shows the physical routing headers and new VCIs to be assigned to packets received on communication path 6114 in VCIs 16, 17 and 65.

Figure 9:
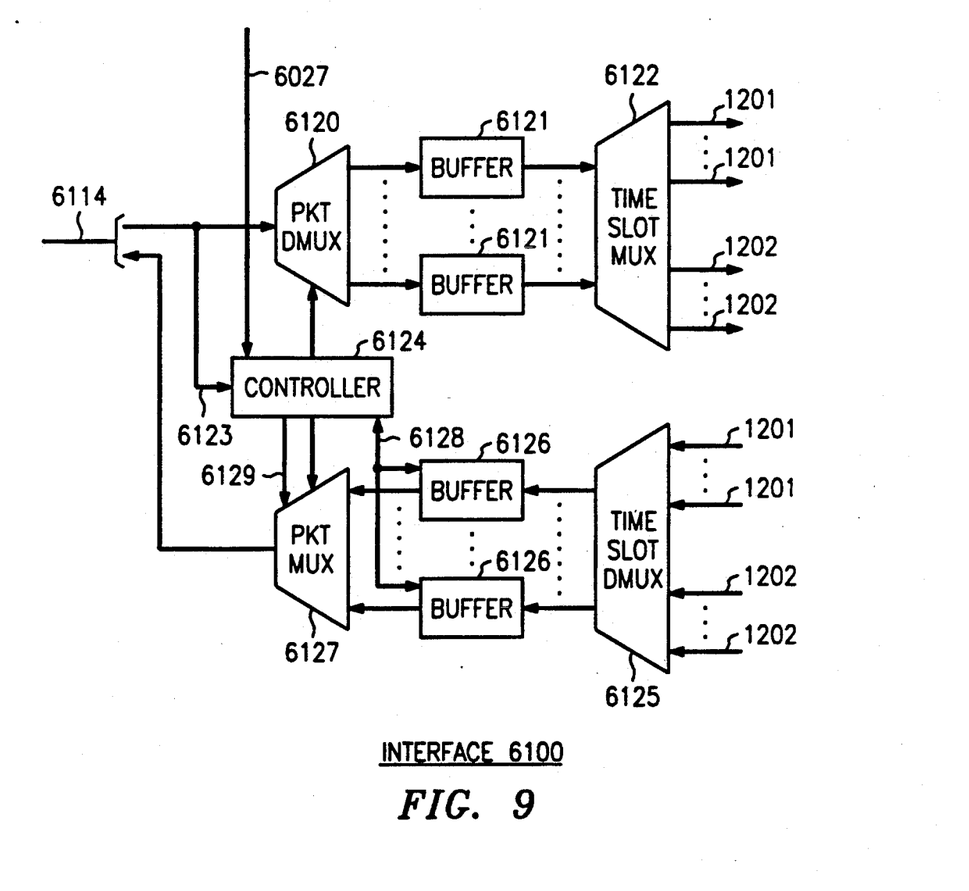
FIG. 9 is a block diagram of an interface unit of FIG. 2.

Interface unit 6100 is shown in greater detail in FIG. 9. All control packets and packets for non-B-ISDN customers are switched by broadband switch unit 6001 to interface unit 6100 via communication path 6114 in the format shown in FIG. 3. The header portion of each packet received by interface 6100 is applied via path 6123 to controller 6124 which interprets the VCI of the packet in accordance with path completion information stored in controller 6124. This stored information specifies the one of a plurality of buffer registers 6121, which is to receive each incoming packet. Responsive to the VCI of an incoming packet, controller 6124 controls the packet demultiplexer 6120 to gate the customer information portion of the packet to the buffer register 6121 specified by the path completion information in controller 6124. Each buffer register is uniquely associated, by the operation of a multiplexor 6122, with a predetermined time slot on a predetermined time-multiplex line, e.g. 1201 and 1202. Time slot multiplexer 6122 gates 1 byte from each buffer 6121 to the predetermined time slots at the rate of 1 byte per buffer per 125 microseconds (64 kilobits per second) as described in detail in the above-mentioned Beckner et al., patent.

Interface 6100 also includes a time slot demultiplexer 6125, which is connected to receive information from time-multiplex lines 1201 and 1202. In a reverse operation of time slot multiplexer 6122, each time slot received by interface 6100 on time-multiplex lines 1201 and 1202 is uniquely associated with one of a plurality of buffers 6126 by the operation of time slot demultiplexer 6125. When a buffer 6126 accumulates an entire packet (48 bytes) it sends a signal via a connection 6128 to controller 6124, which responds thereto by reading the packet from the signaling buffer 6126 and connecting the packet to outgoing communication path 6114 via packet multiplexer 6127. Also in response to the signal from a buffer 6126 on path 6128, controller 6124 generates a 5 byte packet header containing the VCI associated with the signaling buffer and thus associated with the time slot which provides data to that buffer. The generated header is transmitted to packet multiplexer 6127 where it is appended to the packet from buffer 6126 for transmission on communication path 6114.

As previously discussed, control information received by interface unit 6100 in VCIs 16 and 17 of communication path 6114 is connected by the operation of interface unit 6100 to packet switch unit 6400 (FIG. 2) via a predetermined time-multiplex line 1202 and a predetermined time slot. Packet switch unit 6400 in turn connects the control information to control unit 6017 via a processor interface 6300. In addition to the well-known capability for controlling time slot interchange unit 6011, packet switch unit 6400 and for cooperating with other switching modules, control unit 6017 controls the operation of the broadband switch unit 6002 and the interface unit 6100 to provide connections between B-ISDN customers connected to communication paths 6115 and 6116 and between B-ISDN customers connected to communication paths, e.g. 6115 and non-B-ISDN customers connected to other switching modules, e.g., 1000. Control over such connections is implemented by controlling the contents of translation tables 63 of the communication path circuits, e.g. 6003, and the path completion information in controller 6124.

Control unit 6017 controls all communication on communication paths 6114 through 6116 and time-multiplexer lines 1201 and 1202. To maintain such control, information regarding the capacity of each connection facility and the use of each VCI and time slot within the system of FIG. 2 is stored in control unit 6017 and updated whenever a communication change occurs. This information is used as discussed below to complete connections involving B-ISDN customers.

The following is an example of the establishment of an inter-B-ISDN connection from an originating customer connected to communication path circuit 6004 to a destination customer connected to communication path circuit 6003. The originating customer generates a control packet identifying the originating customer, the destination customer and the bandwidth to be allotted to the connection. This packet is transmitted to broadband switch unit 6001 including a B-ISDN header identifying VCI 1, the preassigned B-ISDN control channel. In response to the packet including the VCI 1, communication path circuit 6004 of broadband switch unit 6001 affixes to the packet a physical routing header identifying communication path circuit 6005 and changes the incoming VCI 1 to new VCI 17 (see FIG. 7, line 1)

which identifies a control packet from communication path circuit 6004. The modified packet is then sent to communication path circuit 6005 via the broadband packet switch 6002. Communication path circuit 6005 receives the packet from broadband packet switch 6002 and transmits it over path 6114 to interface unit 6100. In response to the VCI 17 and the path completion information stored in controller 6124, the packet interface unit 6100 places the bytes of the customer information portion of the packet in predetermined time slots of a predetermined time-multiplex line 1202 to packet switch unit 6400.

Packet switch unit 6400 receives the packet in the predetermined time slot of the predetermined time-multiplex line which is reserved for control packets and connects the packet to control unit 6017 via processor interface 6300. The connection of control packets to the associated control unit is described in detail in the previously mentioned Beckner et al., patent. Control unit 6017 interprets the incoming packet as a request for connection between the communication paths 6115 and 6116 connected to communication path circuits 6004 and 6003, respectively and consults a table (not shown) to ascertain whether sufficient bandwidth exists through both of these communication path circuits to serve the requested communication. When insufficient bandwidth exists at either of the communication path circuits, control unit 6017 returns a control message to the originating customer via packet switch unit 6400, the interface 6100 and broadband switch unit 6001 denying the connection. Alternatively, when sufficient bandwidth is present control unit 6017 transmits a set up message over connector 6027 to controller 6006 of broadband switch unit 6001. The set up message specifies the VCIs which are to be used for the connection on each of the communication paths 6115 and 6116.

In the present example, VCI 64 is specified for use on communication path 6115 at communication path circuit 6004 and VCI 18 is specified for use by communication path 6116 at communication path circuit 6003 as represented in FIGS. 6 and 7 at line 2. In response to the set up message, controller 6006 stores in the translation table 63 of trunk controller 6004 (FIG. 7) data specifying the physical routing header (6003) to be affixed to each packet received in the VCI 64 on communication path 6115 to direct packets to trunk controller 6003 and data defining the VCI 18 which is to replace the incoming VCI 64. Similarly, controller 6006 stores in the translation table 63 of trunk controller 6003 (FIG. 6) the physical routing header and VCI 64 which are to be used for packets received at communication path circuit 6003 in VCI 18. In addition to the set up of communication path circuit translation tables 63 of communication path circuits 6003 and 6004, a control message is sent to both the origination and termination customers via a B-ISDN control path through the interface unit 6100 and broadband switch unit 6001 identifying that a connection is established and the VCIs to use for that connection. Since the entire connection involves only a broadband switch 6001, no other unit within broadband switching module 6000 needs to be controlled to provide the connection.

Calls are also set up between narrowband subscribers connected, for example, to narrowband switch module 1000 (FIG. 1) and broadband ISDN subscribers connected to broadband switch module 6000. Such a call requires a connection from the originating communication path, e.g., 6115 to the interface 6100, connection through interface 6100 to time-slot interchange unit 6011 via a time slot on a predetermined time-multiplex line 1201 and a connection to narrowband switch unit 1000 via the time-multiplex switch 10. A request for such a connection is received from the originating B-ISDN customer in the control channel VCI 1 of that customer and is forwarded as described above to control unit 6017. The latter unit determines the availability of bandwidth on communication paths 6115 and 6114 for call completion. It ascertains, by communication with central control 30 and narrowband switch unit 1000 the availability of the destination and the identity of a path through time-multiplex switch 10 to that destination. The establishment of paths between switching modules via time slot interchange units, e.g. 6011, and a time multiplexed switch 10 is described in detail in the above discussed Beckner et al., patent.

When the necessary communication paths are available, control 6017 sends set up messages to controller 6006 of broadband switch unit 6001 and to controller 6124 of interface unit 6100 to specify the VCIs and time slots to be used to provide necessary connections. In the present example, it is assumed that VCI 80 on communication path 6115 and VCI 65 on communication path 6114 are selected by control unit 6017 to complete the connection. Controller 6006 responds to the set up message from control unit 6017 by storing information in the translation tables represented in line 3 of FIGS. 7 and 8. The set up message from control unit 6017 to controller 6124 specifies a selected time slot on a selected time multiplexed line 1201 for use in making the requested connection. Controller 6124 responds to the set up message from control unit 6017 by storing in the controller 6124 path completion information for controlling the transmission of information received in VCI 65 of communication path 6114 to the selected time slot to time slot interchange unit 6011 and for connecting information received in the selected time slot from time slot interchange unit 6011 to VCI 65 on communication path 6114.

In the preceding examples, connections were established in response to call set up packets from broadband customers. Connections between broadband and narrowband customers are also established in response to request messages from narrowband customers. The following is an example of a call set up between a narrowband customer connected to path 1004 (FIG. 1) and a broadband customer connected to communication path 6116. The call set up message identifying the narrowband and broadband customers is received from path 1004 by narrowband switching module 1000 and forwarded to central control 30 via previously established control paths through the time-multiplex switch 10 and control distribution unit 31 which are known in the art and described in detail in the aforementioned Beckner et al. patent. Central control 30 transmits the set up message to the broadband switching module 6000 via pre-established control paths through the control distribution unit 31 and the time-multiplex switch 10 to the time slot interchange unit 6011 (FIG. 2). The time slot interchange unit 6011 connects the set up message to control unit 6017.

Control unit 6017 responds to the set up message in the same manner that it responds to a call set up packet from a broadband customer requesting a broadband-to-narrowband connection, that is, the control unit selects VCIs and physical routing headers for the broadband connection to and from communication path 6116 and interface 6100. Further, control unit 6017 controls interface 6100 to complete the necessary connections through interface 6100 to bi-directionally connect the information making up the requested communication between time slot interchange unit 6011 and communication path 6114. The remainder of the path from time slot interchange unit 6011 to path 1044 of narrowband switching module 1000 is described in detail in the aforementioned Beckner et al. patent.

We claim:

1. A packet switching arrangement comprising:
   a broadband packet switch means, connected to a plurality of broadband customer lines and to a narrowband switch means, for selectively connecting broadband packets among said broadband customer lines and said narrowband switch means;
   means in said broadband switch means responsive to a broadband service request packet from a first broadband customer line requesting a packet communication between said first broadband customer line and a second broadband customer line for connecting said service request packet to said narrowband switch means;
   said service request packet comprises a predetermined signaling virtual channel identifier;
   said broadband packet switch means comprises means responsive to said signaling virtual channel identifier for connecting said service request packet to said narrowband switch means;
   said narrowband switch means comprises means responsive to said service request packet for connecting said service request packet to a control means; and
   said control means is responsive to said service request packet for controlling said broadband packet switch means to selectively connect packets comprising said requested packet communication between said first broadband customer line and said second broadband customer line.

2. The arrangement of claim 1 wherein said service request packet includes a first predetermined signaling virtual channel identifier identifying said service request packet and said broadband packet switch means comprises means responsive to said first signaling virtual channel identifier for replacing said first signaling virtual channel identifier with a second predetermined signaling virtual channel identifier and for connecting said service request packet comprising said second signaling virtual channel identifier to said narrowband switch means.

3. The arrangement of claim 2 comprising means in said narrowband switch means responsive to said second signaling virtual channel identifier for connecting said service request packet to said control means.

4. The arrangement of claim 1 wherein each of said broadband packets comprises a virtual channel identifier and said control means comprises means responsive to said service request packet for selecting a first virtual channel identifier at said first customer line for broadband packets comprising said requested communication and for selecting a second virtual channel identifier at said second customer line for broadband packets comprising said requested communication;
   means for transmitting to said first and said second customer lines the identities of said first and said second virtual channel identifiers; and
   means for controlling said broadband switch means to connect broadband packets including said first virtual channel identifier received from said first customer line to said second customer line and to connect broadband packets including said second virtual channel identifier received from said second customer line to said first customer line.

5. The arrangement of claim 4 wherein said transmitting means comprises means for transmitting a packet identifying said first virtual channel identifier to said first customer line via said narrowband switch means and said broadband packet switch means; and
   means for transmitting a packet identifying said second virtual channel identifier to said second customer line via said narrowband switch means and said braodband packet switch means.

6. The arrangement of claim 1 wherein said broadband packet switch means comprises storage means for storing connection control information and means responsive to said connection control information for selectively connecting received packets among said customer lines; and
   said control means comprises means responsive to said service request packet for writing connection control information in said storage means to effect said requested communication between said first and said second customer lines.

7. The arrangement of claim 1 wherein said broadband switch means comprises a translation table, and said control means comprises means for writing into said translation table information associating said second customer line with packets received from said first customer line comprising said first virtual channel identifier, and information associating said first customer line with packets received from said second customer line comprising said second virtual channel identifier; and
   said broadband packet switch means responsive to said translation table information for connecting packets received from said first customer line comprising said first virtual channel identifier to said second customer line, and for connecting packets received from said second customer line comprising said second virtual channel identifier to said first customer line.

8. The arrangement of claim 1 wherein said narrowband switch means comprises means for selectively connecting packetized representations of signals from a plurality of narrowband customers to said broadband packet switch means.

9. A packet switching arrangement comprising;
   a broadband packet switch means, connected to a plurality of broadband customers and to a narrowband switch means connected to a plurality of narrowband customers, for selectively connecting broadband packets among said broadband customers and said narrowband switch means;
   said call set up packet comprises a predetermined signaling virtual channel identifier;
   said broadband packet switch means comprises means responsive to said signaling virtual channel identifier for connecting said call set up packet to said narrowband switch means;
   said narrowband switch means comprises means responsive to said call set up packet for connecting said call set up packet to a control means; and
   said control means is responsive to said call set up packet for controlling said broadband packet switch means and said narrowband switch means to selectively connect packets comprising said requested packet communication between said one broadband customer and said one narrowband customer.

10. The arrangement of claim 9 comprising means in said narrowband switch unit, responsive to said signaling virtual channel identifier for connecting said call set up packet to said control means.

11. The arrangement of claim 9 wherein each of said broadband packets comprises a virtual channel identifier and said control means comprises means responsive to said call set up packet for selecting a first virtual channel identifier at said one broadband customer for broadband packets comprising said requested communication and for selecting a second virtual channel identifier at said narrowband switch means for broadband packets comprising said requested communication;

means for transmitting to said one broadband customer and said narrowband switch means the identities of said first and said second virtual channel identifiers; and means for controlling said broadband switch means to connect broadband packets including said first virtual channel identifier received from said one broadband customer to said narrowband switch means and to connect broadband packets including said second virtual channel identifier received from said narrowband switch means to said one broadband customer.

12. The arrangement of claim 11 wherein said narrowband switch means comprises:

circuit switch means connected to said plurality of narrowband customers and comprising a plurality of inputs and interface means for selectively connecting representations of received broadband packets comprising said second virtual channel identifier to a predetermined input of said circuit switch means; and said circuit switch means comprises means for connecting said predetermined circuit switch input to said one narrowband customer.

13. The arrangement of claim 12 wherein said circuit switch means comprises a plurality of circuit switch outputs and means for selectively connecting said one narrowband customer to a predetermined one of said circuit switch outputs; and said interface means comprises means for transmitting to said broadband packet switch means a broadband packet comprising said second virtual channel identifier and information received from said one narrowband customer.

14. The arrangement of claim 11 wherein said transmitting means comprises:

means for transmitting a packet identifying said first virtual channel identifier to said one broadband customer via said narrowband switch means and said broadband packet switch means; and means for transmitting information identifying said second virtual channel identifier to said narrowband switch means.

15. The arrangement of claim 9 wherein said broadband switch means comprises storage means for storing connection control information and means responsive to said connection control information for selectively connecting said received packets to ones of said customers;

said control means comprises means responsive to said call set up packet for writing connection control information in said storage means to selectively effect said requested communication between said one broadband customer and said narrowband switch means.

16. The arrangement of claim 9 wherein said narrowband switch means comprises an interface means and a circuit switch means connected to said narrowband customers;

said interface means comprising means for exchanging broadband packets with said broadband switch means, means for coupling representations of said broadband packets from said broadband packet switch means to said circuit switch means and means for conveying information received from said circuit switch means to said broadband packet switch.

17. The arrangement of claim 16 wherein said control means comprises means responsive to said call set up packet for effecting said requested communication by controlling said broadband packet switch means, said interface means and said circuit switch means.

18. A packet switching arrangement comprising;

a broadband packet switch means, connected to a plurality of broadband customers and to a narrowband switch means connected to a plurality of narrowband customers, for selectively connecting broadband packets among said broadband customers and said narrowband switch means, each of said broadband packets comprising a virtual channel identifier;

means in said narrowband switch means for connecting a call set up message received from one of said narrowband customers, requesting a communication between said one narrowband customer and an identified one of said broadband customers, to a control means;

said control means is responsive to said call set up message for controlling said broadband packet switch means and said narrowband switch means to selectively connect packets comprising said requested communication between said one broadband customer and said one narrowband customer;

said control means comprises means responsive to said call set up message for selecting a first virtual channel identifier at said one broadband customer for broadband packets comprising said requested communication and for selecting a second virtual channel identifier at said narrowband switch means for broadband packets comprising said requested communication;

means for transmitting to said one broadband customer and said narrowband switch means the identities of said first and said second virtual channel identifiers; and means for controlling said broadband switch means to connect broadband packets including said first virtual channel identifier received from said one broadband customer to said narrowband switch means and to connect broadband packets including said second virtual channel identifier received from said narrowband switch means to said one broadband customer.

19. The arrangement of claim 18 wherein said narrowband switch means comprises:

circuit switch means connected to said plurality of narrowband customers and comprising a plurality of inputs and interface means for selectively connecting representations of received broadband packets comprising said second virtual channel identifier to a predetermined input of said circuit switch means; and said circuit switch means comprises means for connecting said predetermined circuit switch input to said one narrowband customer.

20. The arrangement of claim 19 wherein said circuit switch means comprises a plurality of circuit switch outputs and means for selectively connecting said one narrowband customer to a predetermined one of said circuit switch outputs; and said interface means comprises means for transmitting to said broadband packet switch means a broadband packet comprising said second virtual channel identifier and information received from said one narrowband customer.

21. An arrangement for switching B-ISDN packets each comprising a virtual channel identifier, said arrangement comprising:

a B-ISDN packet switch means, connected to a plurality of B-ISDN customers and to a narrowband switch means, for selectively connecting B-ISDN packets among said B-ISDN customers and said narrowband switch means;

means in said B-ISDN switch means responsive to a B-ISDN call set up packet requesting a B-ISDN packet communication between first and second ones of said B-ISDN customers for connecting said B-ISDN call set up packet to said narrowband switch means;

said narrowband switch means comprises means responsive to said B-ISDN call set up packet for generating a narrowband representation of said B-ISDN call set up packet and means for connecting said narrowband representation of said call set up packet to a control means;

said control means comprises means responsive to said narrowband representation of said call set up packet for selecting a first virtual channel identifier at said first customer for B-ISDN packets comprising said requested communication and for selecting a second virtual channel identifier at said second customer for B-ISDN packets comprising said requested communication;

means for transmitting to said first and said second customers the identities of said first and said second virtual channel identifiers; and means for controlling said B-ISDN packet switch means to connect B-ISDN packets including said first virtual channel identifier received from said first customer to said second customer and to connect B-ISDN packets including said second virtual channel identifier received from said second customer to said first customer.

22. An arrangement for switching B-ISDN packets each comprising a virtual channel identifier, said arrangement comprising:

a B-ISDN packet switch means, connected to a plurality of B-ISDN customers and to a narrowband switch means connected to a plurality of narrowband customers, for selectively connecting B-ISDN packets among said broadband customers and said narrowband switch means;

means in said B-ISDN switch means responsive to a B-ISDN call set up packet requesting a packet communication between one of said B-ISDN customers and one of said narrowband customers for connecting said B-ISDN call set up packet to said narrowband switch means;

said narrowband switch means comprises means responsive to said B-ISDN call set up packet for generating a narrowband representation thereof and means for connecting said narrowband representation of said call set up packet to a control means;

said control means comprises means responsive to said narrowband representation of said call set up packet for selecting a first virtual channel identifier at said one B-ISDN customer for B-ISDN packets comprising said requested communication and for selecting a second virtual channel identifier at said narrowband switch means for B-ISDN packets comprising said requested communication;

means for transmitting to said one B-ISDN customer and said narrowband switch means the identities of said first and said second virtual channel identifiers; and means for controlling said broadband packet switch means to connect B-ISDN packets including said first virtual channel identifier received from said one B-ISDN customer to said narrowband switch means and to connect B-ISDN packets including said second virtual channel identifier received from said narrowband switch means to said one B-ISDN customer.

23. An arrangement for switching B-ISDN packets each comprising a virtual channel identifier, said arrangement comprising:

a B-ISDN packet switch means, connected to a plurality of B-ISDN customers and to a narrowband switch means connected to a plurality of narrowband customers, for selectively connecting B-ISDN packets among said B-ISDN customers and said narrowband switch means;

means in said narrowband switch means for connecting a call set up message received from one of said narrowband customers, requesting a communication between said one narrowband customer and an identified one of said B-ISDN customers to a control means;

said control means comprises means responsive to said call set up message for selecting a first virtual channel identifier at said one B-ISDN customer for B-ISDN packets comprising said requested communication and for selecting a second virtual channel identifier at said narrowband switch means for B-ISDN packets comprising said requested communication;

means for transmitting to said one B-ISDN customer and said narrowband switch means the identities of said first and said second virtual channel identifiers; and means for controlling said B-ISDN packet switch means to connect B-ISDN packets including said first virtual channel identifier received from said one B-ISDN customer to said narrowband switch means and to connect B-ISDN packets including said second virtual channel identifier received from said narrowband switch means to said one B-ISDN customer.

* * * * *